United States Patent

[11] 3,557,653

| [72] | Inventor | Charles Kim |
| | | 215 W. 83rd St., New York, N.Y. 10024 |
| [21] | Appl. No. | 750,427 |
| [22] | Filed | July 31, 1968 |
| [45] | Patented | Jan. 26, 1971 |

[54] EYELASH MEASURING DEVICE AND TRIMMER
10 Claims, 11 Drawing Figs.

[52] U.S. Cl. .................................................. 83/522,
83/620, 83/701, 83/925, 132/56
[51] Int. Cl. ......................................................... B26d 7/00
[50] Field of Search............................................. 132/1, 31.2,
5, 56, 88.5; 83/522, 620, 640, 925, 701, 635

[56] References Cited
UNITED STATES PATENTS

| 1,450,259 | 4/1923 | Nessler...................... | 132/56X |
| 3,032,042 | 5/1962 | Meehan...................... | 132/56X |
| 3,200,823 | 8/1965 | Sebastian .................. | 132/56X |

*Primary Examiner*—James M. Meister
*Attorney*—Kenyon & Kenyon Reilly Carr & Chapin

ABSTRACT: The measuring device permits a false eyelash to be accurately sized to compliment the user's eye both as to shape and length. The trimmer allows a false eyelash to be cut accurately to size and shape. The measuring device is used manually by an individual to suit the individual's taste.

PATENTED JAN 26 1971
3,557,653
SHEET 1 OF 2
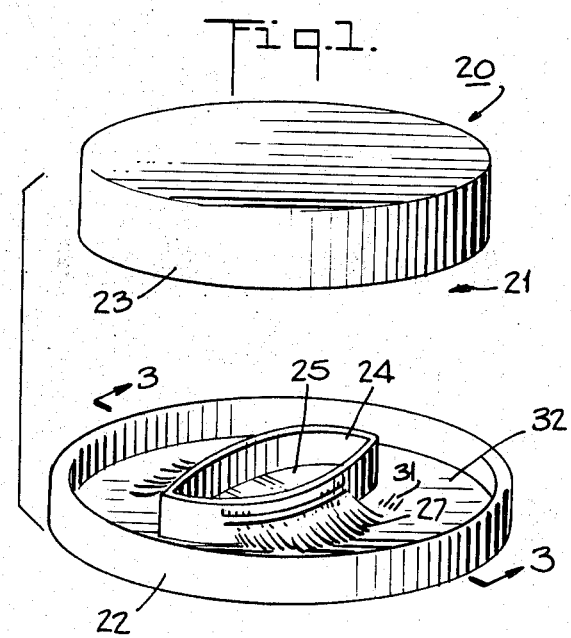
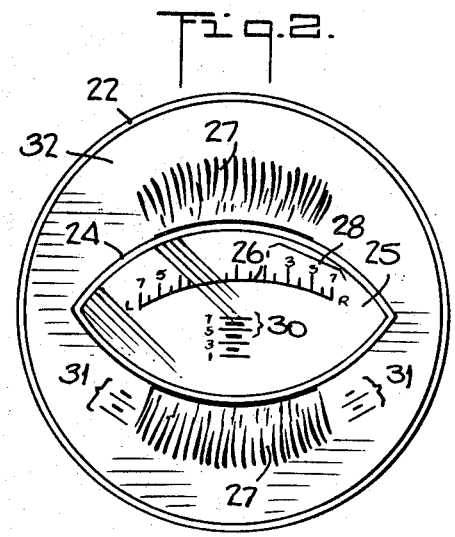
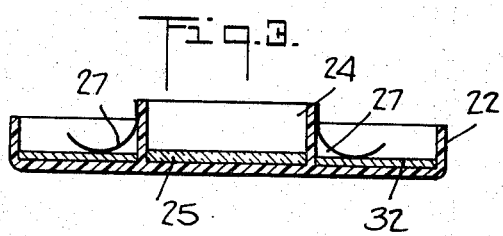
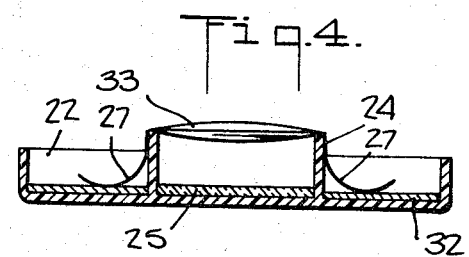
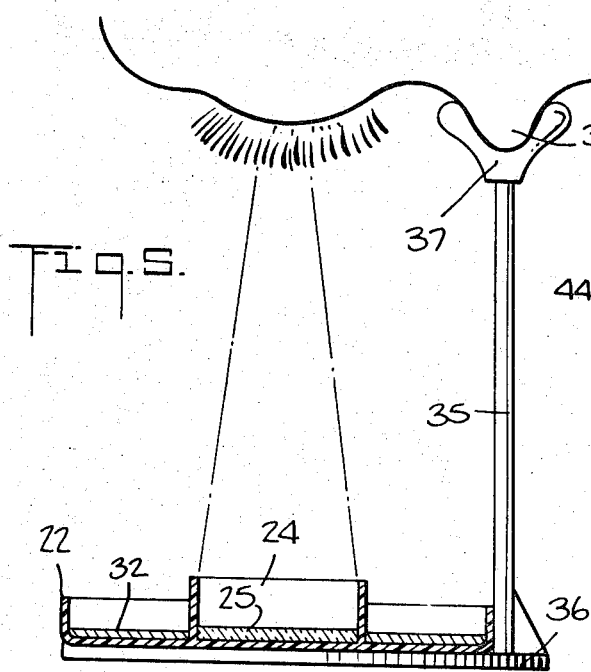
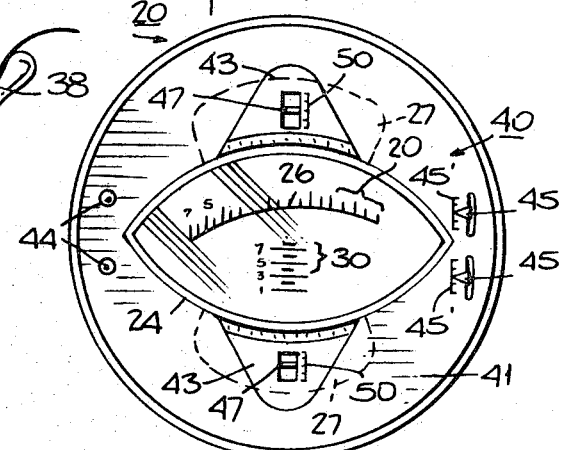
INVENTOR.
CHARLES KIM
BY
Kenyon & Kenyon
ATTORNEYS

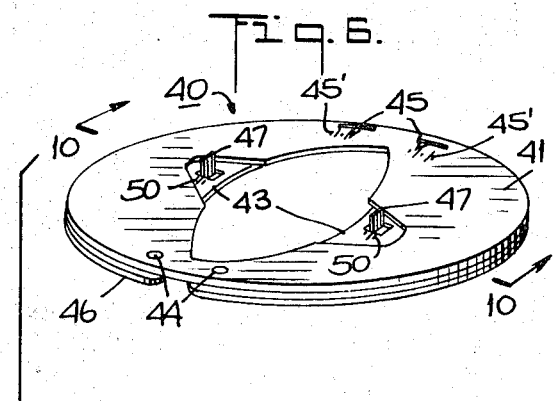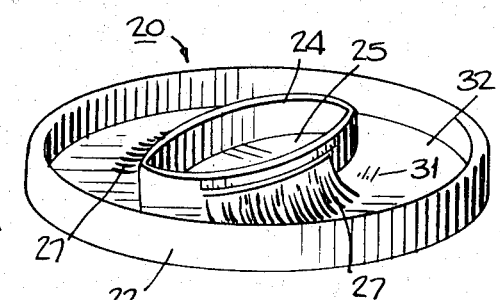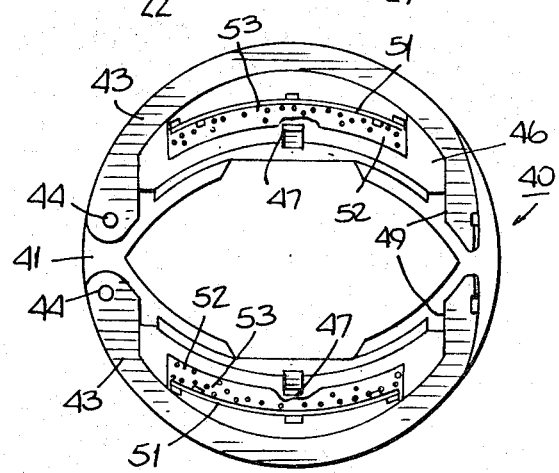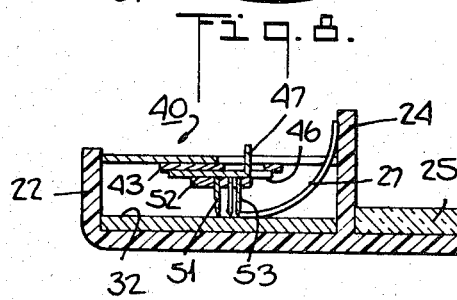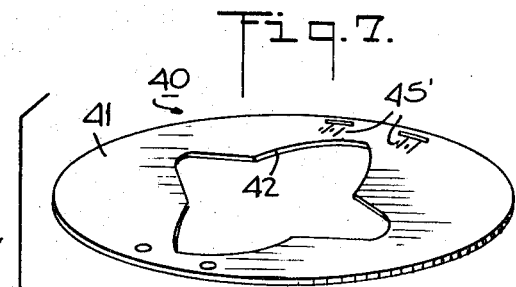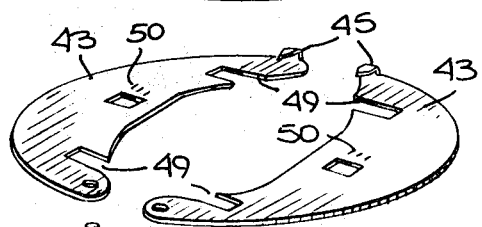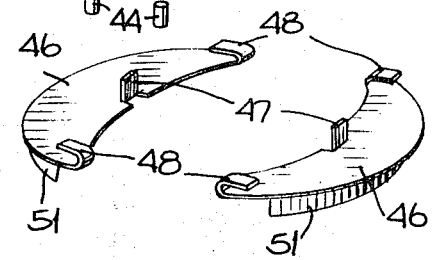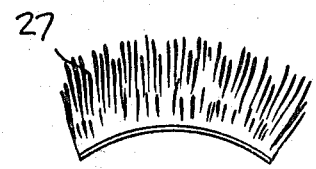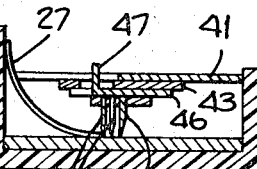

EYELASH MEASURING DEVICE AND TRIMMER

This invention relates to an eyelash measuring device and a trimmer for cutting and shaping a false eyelash. More particularly, this invention relates to a measuring device for individual measurement of a natural eye shape and to a trimmer for accurately cutting and shaping a false eyelash after measurement of one's eye.

False eyelashes have been used cosmetically in order to compliment a user's personal appearance. However, due to the great variation in eye sizes and shapes of individual users, it has been inconvenient to manufacture, sell and stock false eyelashes for each shape or size. Consequently, only a limited number of false eyelash shapes and sizes have been available for selection of an appropriate false eyelash for a user.

Thus, in those instances where a particular pair of false eyelashes has been purchased, the user has frequently been required to cut or otherwise shape the false eyelashes to a desired size and shape in order to obtain the most advantageous cosmetic value from the eyelashes when in use. In such instances the user has usually been confined to the use of scissors or the like cutting implements to shape the eyelashes. This, however, has led to an inaccurate sizing and shaping of the eyelashes as the user generally lacks the degree of skill and experience needed to properly cut the eyelashes. Furthermore, the user has usually relied on guesswork in order to determine how and where the false eyelashes should be cut and shaped to most compliment the user's appearance.

While devices have been used in the past to aid in the measurement of a natural eyelash for the cutting of a false eyelash to the same length, such devices have been cumbersome and difficult to use. Also, where the same device has been used by different users having different basic eye shapes, such devices have been inaccurate.

Accordingly, it is an object of the invention to shape and size a single eyelash to a large number of different eyes.

It is another object of the invention to trim a set of false eyelashes to a desired size and shape.

It is another object of the invention to provide a trimmer which is adjustable so as to shape and size a false eyelash to the eye of a user.

Briefly, the invention provides a measuring device which is used to accurately determine the size and shape of the eyes of a user so as to thereafter accurately size and shape a set of false eyelashes complimentary thereto.

In one embodiment, the measuring device includes a mirrored surface on which a gauge line representing the shape of the user's eye is placed. In addition, a first set of indicia marks are scaled along the gauge line to indicate the length of the user's eye and a second set of indicia marks are scaled below the gauge line to indicate the width, or opening, of the user's eye. The sets of indicia marks are positioned in a predetermined position relative to the gauge line so as to accurately indicate the length and width of a user's eye when the mirrored surface is placed at a predetermined distance from the eye being measured. Further, the second set of indicia marks are positioned to indicate a measured width equal to about one-quarter inch more than the actual opening since natural eyelashes have been found to be of such measured widths in general.

This measuring device is also provided with an upraised wall about the mirrored surface for mounting of a set of false eyelashes thereon. The upraised wall is shaped to conform with the gauge line on the mirrored surface such that one side of the wall is parallel to the gauge line and the opposite side is symmetrically arranged thereon. Also, each side of the wall upon which the respective eyelashes are mounted has a scale thereon which corresponds to the first set of indicia marks along the gauge line. Each of the eyelashes is mounted on the wall alongside each scale so that the eyelash can be cut at the correct length with respect to the measured eye length.

In another embodiment, a lens with a fixed focal point is mounted over the mirrored surface so that the measured device will be correctly positioned with respect to the user's eye.

The invention also provides a trimmer which can be used in conjunction with the measuring device for cutting and shaping an eyelash. The trimmer includes a band type cutting blade which is adjustably mounted to cut the eyelash to the shape of the user's eye. Additionally, the trimmer includes a plurality of needle-like cutters which are fixedly mounted to feather the edges of the respective hairs on an eyelash. The trimmer is shaped in a manner so as to be used with a measuring device as set forth in the first embodiment above. In this manner, the measuring device is used as a guide for the trimmer so as to further ensure an accurate cutting of an eyelash.

These and other objects and advantages of the invention will become more apparent from the following detailed description and appended claims taken in conjunction with the accompanying drawings in which:

FIG. 1 illustrates an exploded perspective view of an eye measuring kit incorporating an eye measuring device of the invention;

FIG. 2 illustrates a plan view of the measuring device of FIG. 1 with a pair of eyelashes mounted on opposite sides of the upraised wall;

FIG. 3 illustrates a view taken on line 3–3 of FIG. 1;

FIG. 4 illustrates a view similar to FIG. 3 of a modified measuring device utilizing a lens according to the invention;

FIG. 5 illustrates a cross-sectional view of a modified eye measuring device with a mounting bracket;

FIG. 6 illustrates an exploded perspective view of a trimmer and associated measuring device according to the invention;

FIG. 7 illustrates an exploded perspective view of the trimmer of FIG. 6;

FIG. 8 illustrates a bottom view of the trimmer of FIG. 6 with a cutting blade and needlelike cutters;

FIG. 9 illustrates a top view of the trimmer in place over the measuring device of FIG. 6;

FIG. 10 illustrates a view taken on line 10–10 of FIG. 6; and

FIG. 11 illustrates a view of a false eyelash cut and shaped according to the invention.

Referring to FIG. 1, an eyelash kit 20 includes a two-piece housing 21 having a base 22 and a cover 23. The housing 21 is formed of any suitable material such as plastic and the cover 23 is transparent so as to permit viewing of the contents of the kit 20.

Referring to FIGS. 1 to 3, the base 22 which can be circular in shape has an upraised wall 24 about the center which defines an enclosed area. This wall 24 is made integrally with the base 23 or is otherwise secured to the base 23 as by bonding. Also, a mirrored surface 25 is secured to the base 23 within the enclosed area of the wall 24. The surface 25 is made of any suitable mirrored material such as a coated plastic, silvered glass, or the like. A gauge line 26 (FIG. 3) is formed on the mirrored surface 25 to represent the upper contour shape of an eye. For example, the gauge line 26 can be shaped to represent a round, almond, or oval shape or an average of theses three shapes. Further, the gauge line 26 is formed on the mirrored surface in a precise manner according to the curvilinear shape of an eye. The application of the gauge line 26 can be done by inking, etching, plating, or the like.

The shape of the wall 24 is correlated to the shape of the gauge line 26 so that one side is parallel to the gauge line 26 while the opposite side is symmetric thereto. Each side of the wall 24 has one of the pair of false eyelashes 27 removably mounted thereon as by a pressure sensitive adhesive.

A first set of indicia marks 28 are placed on the mirrored surface 24 along the length of the gauge line in ascending order to indicate the length of a measured eye. A scale 29 (FIG. 1) is similarly provided on each side of the wall 24 adjacent the eyelashes 27 in correlation with the indicia marks 28 to indicate the measured eye length on the eyelashes 27.

Similarly, a second set of indicia marks 30 disposed horizontally with respect to the gauge line 26 is provided on the mirrored surface 25 to measure the width or opening of an eye. A scale 31 is provided adjacent the wall 24 on an insert 32 within the base 22 or directly on the surface of the base and adjacent to each eyelash 27 on one or both sides thereof. The scales 31 are correlated to the second set of indicia marks 30 to indicate the length of the hairs of the eyelash for a measured eye. In this latter regard, it has been determined that the hair length of a natural eyelash exceeds the eye opening by about one-quarter inch. Accordingly, the scales 31 are marked to add this excessive length to the measured value obtained from the indicia marks 30.

The respective indicia marks 28, 30 and scales 29, 31 are accurately placed on the measuring device 20 to correlate with the gauge line 26 so as to permit an accurate sizing and shaping of an eyelash 27 to a measured eye.

In use, the user holds the base 22 of the measuring device 20 a predetermined distance in front of the eye to be measured, i.e. the left eye for the device as shown in FIG. 2. This predetermined distance is correlated to the gauge line 26 so that the correct size of the eye can be measured by the device 20. For example, the base 22 is held so that the mirrored surface 25 is 7 inches from the eye. Next, with the gauge line 26 aligned along the upper contour of the eye with the right hand end positioned at the right end of the eye and the indicia marks 30 disposed horizontally, the length of the eye is determined from the indicia mark over the left end of the eye. At the same time, the eye opening is determined from the indicia mark at the bottom edge of the eye. Thereafter, each eyelash 27 is cut to the measured length and width at the correlated points defined by the indicia of the scales 29, 31. Thus, the shaped eyelashes 27 are then removed from the wall 24 and applied to the respective eyelids of the user.

Referring to FIG. 4, wherein like numerals have been used to indicate like parts as described above, in order to ensure that the mirrored surface 25 is positioned at the correct distance from the eye of a user, a measuring device 33 in the form of a lens having a fixed focus which is mounted on the wall 24 over the mirrored surface 25. As the lens 33 has only one focal point, the mirrored surface 25 is held at the same distance from the eye of any user. The measuring device 33 is used in the same manner as that above described.

Referring to FIG. 5, wherein like numerals have been used to indicate like parts as above, an alternate manner of ensuring the correct positioning of the measuring device 20 from a user's eye includes the use of a bracket 35 which is mounted in a vertical manner on the base 22. To this end, the mounting bracket 35 can be mounted on a flat surface 36 adjacent the periphery of the base 22 (as shown) or can be mounted directly on the insert 32 (not shown). This mounting bracket 35 which can be collapsible so as to permit reduction in size for packaging with the measuring kit 20 (FIG. 1) has a nose rest 37 for supporting a user's nose 38 therein in a position to align the user's eye 39 with the mirrored surface 25. Alternatively, any mounting bracket can be used to fix a portion of the user's head, e.g. the forehead, a fixed distance from the measuring device.

Referring to FIG. 6, wherein like numerals have been used to indicate like parts as above, the measuring device 20 cooperates with a trimmer 40 which cuts the eyelashes 27 to a shape desired. The trimmer 40 also functions to feather the free ends of the eyelash hairs.

Referring to FIGS. 7, 8 and 10, the trimmer 40 includes a template 41 of circular shape which is sized to fit within the base 22 of the measuring device (FIG. 6). The template 41 includes a central aperture 42 which is shaped partially to fit about the wall 24 of the base 22 (FIG. 9). Further, a pair of crescent shaped elements 43 are adjustably mounted on the template 41 to pivot about one end transversely of the aperture 42 and the wall 24 of the measuring device when in place. Each element 43 is pivotally secured at one end, as by a rivet 44, to the template 41 and has a pointer 45 at the opposite end which cooperates with a scale 45' on the opposite surface of the template 41 to indicate the degree of shape to be imparted to a cut eyelash. Also, a pair of arcuate slides 46 are adjustably mounted on the elements 43. Each slide 46 has a centrally located tang 47 which projects through a crescent shaped element 43 and the template 41 and a pair of bent flanges 48 which slide within suitable slots 49 of an element 43. Each slide 46 is slidable transversely of an element 43 via the tang 47 so as to adjust the trimmer 40 to cut the eyelash hairs to the measured length. A suitable scale 50 which is correlated with the measuring indicia marks 30 on the measuring device 20 is placed on each element 43 to cooperate with the tangs 47 to ensure correct positioning of the slides 46.

Referring to FIGS. 8 and 9, each slide 46 has an endless cutting blade 51 mounted thereon within a suitable holder 52 for exposing sequential portions of the blade 51. In addition, a plurality of groups of needlelike cutting elements 53 having cutting edges are mounted in the holder 52. The cutting blade 51 is mounted on the slide 46 so as to cut an eyelash into a predetermined shape. For example, depending on the amount of pivoting of the elements 43 relative to the template 41, an eyelash can be cut with a shape which is of uniform hair length along the length of the eyelash, or of decreasing or increasing hair length along the length of the eyelash.

Referring to FIGS. 8, 9 and 10, after a user's eye length and width are measured with the measuring device 20 as above described, the degree of shape for the eyelashes 27 is selected, for example, from a catalogue of shapes, and the elements 43 are pivoted on the template 41 until the pointers 45 reach the points on the scales 45' representing such shape. The movement of the elements 43 can be accomplished manually or mechanically as well as individually or simultaneously. Next, the slides 46 are moved via the tangs 47 until the tangs 47 reach a point on the respective scales 50 correlated to the measured eye opening. Thereafter, with the cutting blade 51 and needlelike cutting elements 53 having chisellike cutting ends disposed downwardly, the trimmer 40 is placed within the measuring device 20 about the wall 24 and is pressed down against the eyelashes 27 and insert 32 which can be suitably padded. This causes the cutting blade 51 and cutting elements 53 to shape and feather the eyelashes 27 (FIG. 11). That is, since the elements 53 have chisellike cutting ends, as the trimmer 40 is pressed against the insert 32 with the several lashes of the eyelash 27 disposed below respective cutting elements, the respective lashes are severed by the cutting ends. Further, since the cutting elements 53 are disposed in a random order on the trimmer the several lashes of the eyelash 27 are cut to different lengths (FIG. 11) to achieve a feathered appearance. It is this unevenness in the overall shape of the ends of the eyelash 27 that is known and referred to as feathering. The trimmer 40 is then removed from the measuring device 20. The eyelashes 27 can then be cut to the measured length and removed for mounting on the user's eyelids. Alternatively the eyelashes can be cut to the measured length before shaping and feathering by the trimmer 40.

The invention provides an eyelash trimmer which simply and accurately cuts a false eyelash to a desired shape while also feathering the eyelash so as to impart a natural appearance thereon. The trimmer is used in combination with the measuring device of the invention so that a false eyelash can be rapidly and accurately cut, shaped and feathered to suit the eyes of the user.

I claim:

1. In combination with a base having an upstanding wall for mounting of a pair of false eyelashes in opposite outwardly extending direction thereon, a trimmer for shaping the eyelashes comprising:
   a template having an aperture therein for positioning said trimmer on the base,
   a pair of elements pivotally mounted on said template at one end thereof to pivot transversely of the aperture,
   a pair of arcuate slides slidably mounted on each respective one of said elements to move transversely thereof, and
   means connected to said arcuate slides to cut each respective eyelash disposed thereon to a predetermined shape.

2. The combination as set forth in claim 1 wherein each element includes a pointer at the free end thereof in overlying relation to said template, and said template includes a scale adjacent each pointer for indicating the points at which each element is to be pivoted to shape each false eyelash to conform with a predetermined shape.

3. The combination as set forth in claim 1 wherein each said slide includes an upstanding tang passing through said respective element and said template for moving said slide relative to said element, and each element includes a scale disposed adjacent said tang passing therethrough for indicating the points at which the hairs of each false eyelash are to be cut for a measured eye opening.

4. The combination as set forth in claim 1 wherein said trimmer further includes a plurality of needlelike cutting elements disposed adjacent said cutting blade for feathering the edges of each false eyelash.

5. A trimmer for shaping false eyelashes comprising:
a template having means thereon for positioning the trimmer in relation to a false eyelash
cutting means connected to said template for cutting the eyelash to a predetermined shape, and
means adjustably mounting said cutting means to said template for adjusting the relative position of said cutting means relative to said trimmer.

6. A trimmer as set forth in claim 5 wherein said cutting means includes a cutting blade for shaping the eyelash.

7. A trimmer as set forth in claim 5 which further comprises means for feathering the ends of the hairs of the eyelash to be cut.

8. A trimmer as set forth in claim 7 wherein said means for feathering includes a plurality of needlelike cutting elements.

9. A trimmer as set forth in claim 5 wherein said means adjustably mounting said cutter means includes a pair of elements pivotally mounted on said template at one end thereof to pivot relative to said template, and a pair of arcuate slides slidably mounted on each respective one of said elements to move transversely thereof, each said slide having a cutting means mounted thereon in dependent relation thereto.

10. A trimmer as set forth in claim 9 which further comprises means for feathering the ends of the eyelash.